UNITED STATES PATENT OFFICE 2,017,368

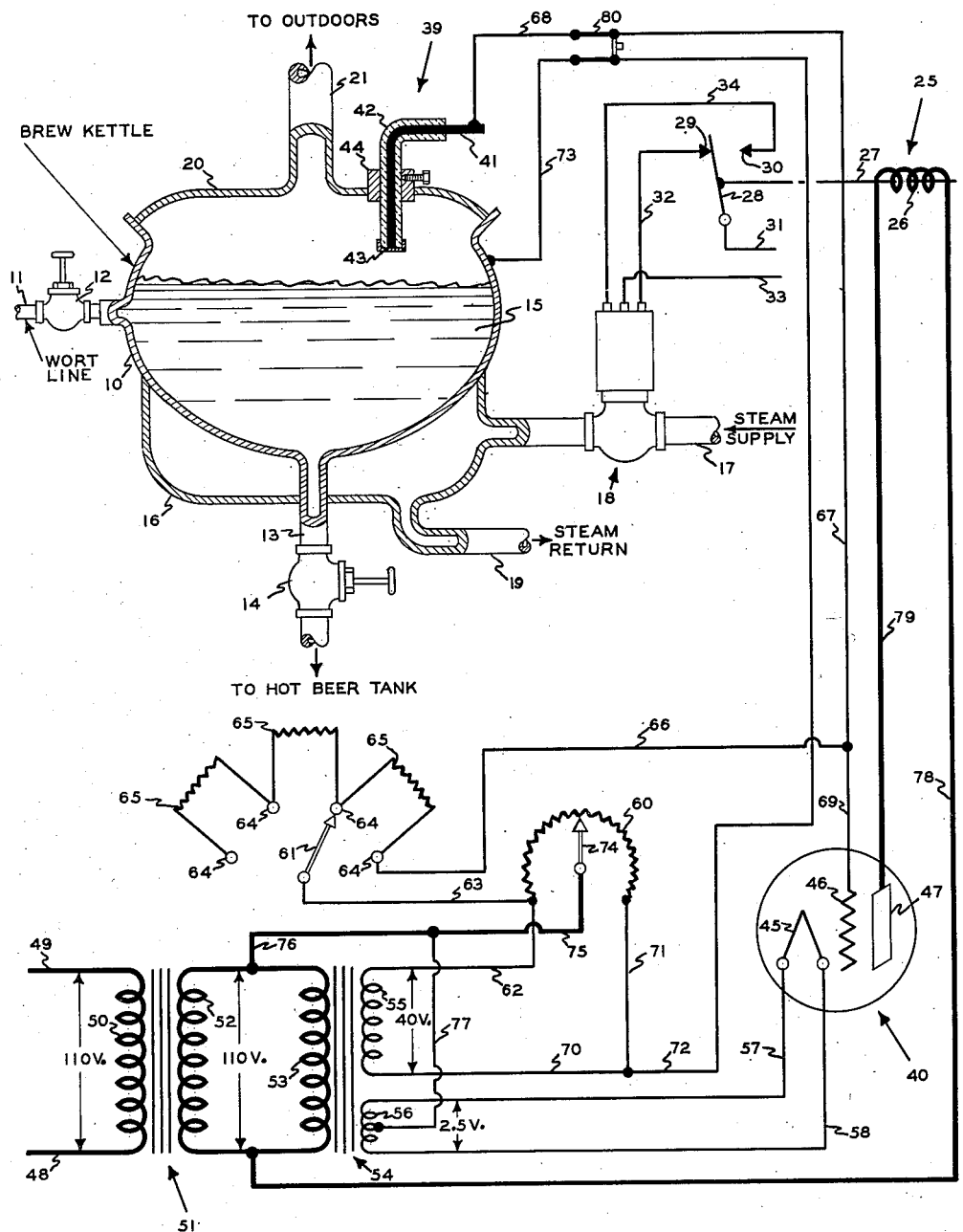

SYSTEM FOR CONTROLLING THE TURBULENCE OF FLUIDS

Philip G. Magner, Wabash, Ind., assignor to Minneapolis-Honeywell Regulator Company, Minneapolis, Minn., a corporation of Delaware Application July 5, 1934, Serial No. 733,766

17 Claims. (Cl. 236—1)

The present invention relates to the controlling of process operations upon a liquid, mixture, or the like, which operation causes turbulence, agitation, boiling or foaming of the liquid or mixture being operated upon.

One of the objects of the present invention is the automatic decreasing or stopping of an operation which causes turbulence, agitation, boiling or foaming of a liquid or mixture when the liquid or mixture is thereby raised to a predetermined height or level.

A further object of the invention is the provision of an automatic control system for decreasing or stopping the heating of a liquid or mixture when the liquid or mixture reaches a predetermined height or level as the result of boiling or foaming or other turbulent conditions arising by reason of the heating of the liquid or mixture.

Other objects of the invention will be found in the detailed description, the drawing and in the appended claims.

For a more complete understanding of the invention, reference may be had to the following description and the accompanying drawing which is a diagrammatic showing of the preferred form of the invention.

Referring to the drawing, the invention is shown as applied to one of the steps in the process of making beer. A brew kettle 10 is provided with an inlet wort line 11 which is controlled by a hand-valve 12 by means of which the brew kettle 10 may be charged with a suitable amount of the wort mixture which is transmitted thereto by the wort line 11. The brew kettle 10 is further provided with a discharge line 13 controlled by a hand-operated discharge valve 14 by which the wort mixture may be discharged to a hot beer tank after the mixture has been suitably heated. This mixture is indicated in the brew kettle 10 at 15.

The turbulence or agitation or foaming of the mixture 15 is caused in this particular process by means of heat. For this purpose, the brew kettle 10 is provided with a steam jacket 16 which is adapted to be supplied with a heat supplying fluid, such as steam, by means of a steam supply pipe 17 controlled by an electrically operable valve generally indicated at 18. The steam discharges from the jacket 16 by means of a return pipe 19. The brew kettle 10 is further provided with a cover 20 having a discharge pipe 21 by means of which the fumes and vapors created upon boiling of the wort mixture 15 are discharged to the outdoors.

The electrically operable valve 18 is controlled by a relay generally indicated at 25 which includes a relay coil 26, an armature 27 and a switch arm 28 which engages a contact 29 when the relay coil 26 is deenergized and is moved into engagement with a contact 30 upon energization of relay coil 26. The switch arm 28 and contact 29 control an opening circuit for the electrically operable valve 18 which includes a line wire 31, switch arm 28, contact 29, a wire 32 and a return line wire 33. Similarly, the switch arm 28 and contact 30 control a closing circuit for electrically operable valve 18 which includes the line wire 31, switch arm 28, contact 30, a wire 34, and the return line 33. It will therefore be evident that upon energization of relay coil 26, the switch arm 28, in moving into engagement with contact 30, closes the electrically operable valve 18 to prevent the passage of steam to the jacket 16 and to decrease the heating effect on the mixture 15 contained in the brew kettle 10. Similarly, upon deenergization of relay coil 26 and movement of switch arm 28 into engagement with contact 29, the electrically operable valve 18 is moved to open position to establish the supply of steam to jacket 16 whereupon heating of the mixture 15 in the brew kettle 10 takes place.

The energization of relay coil 26 is controlled by an electrode assembly generally indicated at 39, through the medium of a thyratron tube generally indicated at 40. The electrode assembly 39 includes a conductor 41 which is sealed in a tubular member 42 of insulating material such as Pyrex glass and has one end secured to a metallic cap 43 which surrounds the end of the tubular glass insulating member 42. This electrode assembly 39 is adjustably and removably mounted in the cover 20 of the brew kettle 10 by means of a collar 44, the arrangement being such that the cap 43 is disposed above the mixture 15 at the point beyond which it is not desired the mixture 15 or the foam created thereon upon heating to rise.

The thyratron tube 40 includes the usual filament 45, grid 46, and plate 47. Power is supplied by the usual line wires 48 and 49, having a 110 volt potential therebetween, which are connected to the primary 50 of a transformer 51, having a 110 volt secondary 52. The secondary 52 of transformer 51 is connected to the primary 53 of a step-down transformer 54 that is provided with a 40 volt secondary 55 and a 2½ volt secondary 56. The 2½ volt secondary 56 is connected to the filament 45 by means of wires 57 and 58. One side of the 40 volt secondary 55 is connected to one end of a potentiometer resistance 60 and to a contact arm 61 by means of wires 62 and 63. The resistance 60 has a resistance value of 1600 ohms. The contact arm 61 is adapted to engage a plurality of contacts 64 between each of which is placed a suitable resistance of say 1 megohm, indicated at 65. One of the end contacts 64 is connected to the conductor 41 of electrode assembly 39 and to the grid 46 by means of wires 66, 67, 68 and 69. The other side of the 40 volt secondary 55 is connected to the other end of potentiometer resistance 60 and to the brew kettle 10 by means of wires 70, 71, 72 and 73. A potentiometer contact arm 74, which cooperates with resistance 60, is connected to one side of secondary 52 and to the center of 2½ volt secondary 56 by means of wires 75, 76, and 77. One end of relay coil 26 is connected to the other side of secondary 52 by a wire 78 and the other end of relay coil 26 is connected to the plate 47 by a wire 79. A manually operable double-pole single-throw switch 80 is preferably interposed between wires 67 and 68 and wires 72 and 73 so that the controlling electrode 40 and the brew kettle connecting wire 73 may be disconnected from the rest of the circuit when desired.

With the parts in the position shown, the foam produced upon heating of the mixture 15 and the mixture itself is out of contact with the cap 43 of electrode assembly 39 so that the grid 46 is provided with a sufficient bias to prevent the flow of electrons between the filament 45 and the plate 47. This biasing circuit goes from the filament 45 by way of wires 57 and 58 to the center-tap wire 77 and then to potentiometer contact arm 74 by wire 75, through the left-hand portion of potentiometer resistance 60 and through one of the resistances 65 by way of wire 63 and contact arm 61, and then to the grid 46 by wires 66 and 69. The thyratron tube 41 being thus blocked by the bias on its grid 46 allows no current to pass from the plate 47 to the filament 45 so the relay coil 26 is deenergized. The switch arm 28 is therefore engaged with contact 29 and the steam valve 18 is open so as to allow the supplying of steam to the jacket 16.

Whenever the mixture 15 becomes heated to such an extent that it or the foam produced by such heating engages the cap 43 of electrode 40, then a circuit is set up as follows: one side of 40 volt secondary 55, wire 62, wire 63, contact arm 61, one of resistances 65, wire 66, wire 67, switch 80, wire 68, conductor 41, the cap 43 of the electrode assembly 39 to the foam or mixture 15, brew kettle 10, wire 73, switch 80, wire 72, and wire 70 to the other side of the secondary 55. This circuit reduces the bias on grid 46 to such an extent that electrons flow from the filament 45 to the plate 47 and thereby ionize the gas within the thyratron tube 40. An energizing circuit for relay coil 26 is thus established as follows: from one side of the secondary 52 of transformer 51, wire 76, center-tap wire 77, wires 57 and 58 to filament 45, plate 47, wire 79, relay coil 26, and wire 78 to the other side of the secondary 52. Armature 27 is thereby attracted and moves switch arm 28 into engagement with contact 30 whereupon the closing circuit for steam valve 18 is completed as heretofore described. The steam valve 18 therefore closes and no further steam can be furnished to steam jacket 16 until the mixture 15 or the foam thereof recedes from engagement with the cap 43 of electrode assembly 39 whereupon the parts are returned to the position shown in the drawing. In this manner, the supply of heat to the brew kettle 10 is interrupted when the mixture or foam thereon becomes higher than desired.

The potentiometer comprised by potentiometer resistance 60 and potentiometer contact finger 74 may be utilized to change the amount of bias on the grid 46 in order to compensate for the variations in the amount of bias required to prevent passage of current through different thyratron tubes, it being commercially impractical to build all such tubes so that each one requires the same biasing effect to block passage of current therethrough. A greater or lesser number of resistances 65 may be placed in the biasing circuit for the grid 46 by manipulation of contact arm 61 so as to provide the proper change in bias upon the grid 46 to allow passage of current through the thyratron tube 40 in accordance with the differences in resistance in the control circuit by reason of the utilization of varying liquids or mixtures. Also, by properly adjusting the number of resistances 65 in the control circuit, the reduction in bias on the grid 46 by reason of any vapors or steam engaging the cap 43 of electrode assembly 39 can be made small enough to prevent unblocking of the thyratron tube 40 so that the system will only respond to an actual presence of foam i engagement with the cap 43.

Inasmuch as the brew kettle 10 is difficult to insulate from ground and since in all commercial wiring one side of the line is always grounded, the transformer 51 is utilized to produce a line voltage supply of power (by the secondary 52) which is not grounded whereby to eliminate the necessity of insulating the brew kettle 10 from the ground.

While the invention has been shown as specifically applied to the control of a foam line in one of the steps of beer making, it will be understood that the turbulence or agitation or foaming could well be produced in similar processes through means other than heating and that the invention is equally well applicable to other fluids or mixtures. The term "liquid" as used in the appended claims is therefore intended to include mixtures of various types even though they do not include any liquid as well as a liquid per se. Also, the term "turbulence" as used in the claims is intended to include the agitation of a "liquid" as well as the boiling or foaming thereof whether produced by heating or otherwise.

It will be readily apparent that many changes can be made by those skilled in the art without departing from the spirit of this invention, and I therefore intend to be limited only by the scope of the appended claims.

I claim:

1. The combination with means for causing turbulence of a liquid which it is desired to maintain below a predetermined level, of an element located out of contact with said liquid but adapted to be engaged thereby upon turbulence of said liquid, and connections between said element and turbulence causing means for affecting the turbulence causing means.

2. In combination, an element located out of contact with a liquid in its normal state, means for causing turbulence of said liquid whereby the liquid may engage said element, and connections between said element and turbulence causing means rendered operative upon engagement of the element by the liquid for operating the turbulence causing means to reduce the turbulence of the liquid.

3. The combination with a container having liquid therein, of a conductor located out of contact with the liquid, means for causing turbulence of the liquid whereby the same may engage said conductor, and an electrical circuit controlled by engagement of the liquid with the conductor for controlling the turbulence causing means to reduce the turbulence of the liquid.

4. The combination with a container having liquid therein, of a conductor located out of contact with the liquid, means for causing turbulence of the liquid whereby the same may engage said conductor, an electrically operable device associated with said turbulence causing means for reducing turbulence of the liquid when said device is energized, and an energizing circuit for the device completed upon engagement of the liquid with the conductor.

5. The combination with a container having liquid therein, of a conductor located out of contact with the liquid, means for causing turbulence of the liquid whereby the same may engage said conductor, an electrically operable device associated with said turbulence causing means for reducing turbulence of the liquid when said device is energized, a space discharge tube including a control element, a circuit for the device including the space discharge tube, and a circuit for controlling the charge on the control element of the space discharge tube adapted to be completed when the liquid engages said conductor.

6. The combination with a container having liquid therein, of a conductor located out of contact with the liquid, means for causing turbulence of the liquid whereby the same may engage said conductor, an electrically operable device associated with said turbulence causing means for reducing turbulence of the liquid when said device is energized, a space discharge tube including a filament, a grid and plate, a circuit for the device including the filament and plate of the tube, a circuit for biasing the grid, and a circuit for reducing the bias on the grid which is completed when the liquid engages said conductor.

7. The combination with a container for a liquid, of an element located out of contact with said liquid but adapted to be contacted thereby when turbulence of the liquid is created, heating means for heating said liquid and creating turbulence thereof, and connections between the element and heating means rendered operative upon engagement of the element by the liquid for reducing the heating effect upon said liquid.

8. A system of the class described, comprising, in combination, a container, a supply of liquid therein, a conductor placed out of contact with the liquid but adapted to be engaged thereby when turbulence of the liquid is caused, heating means for heating the liquid and causing turbulence thereof, and an electrical control circuit associated with the heating means for reducing the heating of the liquid when completed, said circuit including the conductor and liquid.

9. In combination, a supply of liquid to be heated, means for heating the liquid, a conductor normally out of contact with the liquid but adapted to be engaged thereby when the liquid is heated sufficiently to cause turbulence thereof, an electrically operable device in control of the heating means, a space discharge tube including a grid in control of said device, and a circuit for changing the potential on the grid of said tube and including the conductor and liquid.

10. In combination, a supply of liquid to be heated, means for heating the liquid, a conductor normally out of contact with the liquid but adapted to be engaged thereby when the liquid is heated sufficiently to cause turbulence thereof, an electrically operable device in control of the heating means for reducing the heating effect thereon when the device is energized, a space discharge tube including the filament, a grid and a plate, a circuit for the device including the filament and plate of the space discharge tube, a potential biasing circuit for the grid of the tube, and a circuit for reducing the biasing potential on the grid including the conductor and the liquid.

11. In combination, a container, a supply of liquid therein, a supply of fluid for heating the liquid in the container, a valve in control of the supply of fluid, a conductor normally out of engagement with the liquid in the container but adapted to be engaged thereby upon turbulence of the liquid as a result of heating, and electrical means controlled by engagement of the liquid with the conductor for controlling the valve to reduce the supply of heating fluid.

12. In combination, a container, a supply of liquid therein, means for causing turbulence of the liquid, a circuit which is closed as a result of turbulence of the liquid, and electrical means controlled by the circuit for operating the turbulence causing means to reduce the turbulence of the liquid.

13. The combination with a brew kettle having a wort mixture therein, of means for heating the wort mixture, a conductor normally out of contact with the wort mixture but adapted to be engaged by the foam produced upon heating thereof, and a circuit completed upon engagement of the conductor by the foam for reducing the heating of the wort mixture.

14. The combination with a brew kettle having a wort mixture therein and a supply of steam for heating the wort mixture, of an electrically operable valve in control of the supply of steam, a conductor located out of contact with the wort mixture when cold but adapted to be engaged by the foam produced upon heating thereof, and a control circuit for operating the valve to reduce the supply of steam including the conductor and foam formed on the wort mixture.

15. The combination with a brew kettle having a wort mixture therein, of means for heating the wort mixture, a conductor normally out of contact with the wort mixture but adapted to be engaged by the foam produced upon heating thereof, an electrical device in control of the supply of heat to the wort mixture, a space discharge tube including a grid, a circuit for the device controlled by the tube, and a circuit for changing the grid potential controlled by contacting of the wort foam with the conductor.

16. The combination with a brew kettle having a wort mixture therein, of means for heating the wort mixture, a conductor normally out of contact with the wort mixture but adapted to be engaged by the foam produced upon heating thereof, an electrical device in control of the supply of heat to the wort mixture, a space discharge tube including a filament, grid and plate, a circuit for the device including the filament and plate of the tube, a grid biasing circuit for blocking the passage of current through the tube, and a circuit for reducing the bias on the grid to unblock the tube and rendered operative upon contacting of the foam of the wort mixture with the conductor.

17. The combination with a brew kettle having a wort mixture therein, of means for heating the wort mixture, a conductor normally out of contact with the wort mixture but adapted to be engaged by the foam produced upon heating thereof, an electrical device in control of the supply of heat to the wort mixture, a space discharge tube including a filament, grid and plate, a circuit for the device including the filament and plate of the tube, a grid biasing circuit for blocking the passage of current through the tube, a circuit for reducing the bias on the grid to unblock the tube and rendered operative upon contacting of the foam of the wort mixture with the conductor, and an adjustable resistance in the grid bias reducing circuit for compensating for variations in the resistance of the grid bias reducing circuit.

PHILIP G. MAGNER.